(12) United States Patent
Tarlow et al.

(10) Patent No.: US 7,429,078 B1
(45) Date of Patent: Sep. 30, 2008

(54) PORTABLE CARGO STORAGE AND WALLED ENCLOSURE ASSEMBLY

(76) Inventors: Kenneth Allan Tarlow, 21 Golden Hind Passage, Corte Madera, CA (US) 94925; Michael William Faber, 833 Abbie St., Pleasanton, CA (US) 94566; Christopher David Faber, 833 Abbie St., Pleasanton, CA (US) 94566

( * ) Notice: Subject to any disclaimer, the term of this patent is extended or adjusted under 35 U.S.C. 154(b) by 343 days.

(21) Appl. No.: 11/280,701

(22) Filed: Nov. 17, 2005

(51) Int. Cl.
*A47C 7/62* (2006.01)
(52) U.S. Cl. ............... 297/188.01; 224/275; 297/188.2
(58) Field of Classification Search ........... 297/188.01, 297/188.2, 216.1, 250.1; 119/28.5, 771; 224/275
See application file for complete search history.

(56) References Cited

U.S. PATENT DOCUMENTS

| | | | | |
|---|---|---|---|---|
| 1,179,445 A | * | 4/1916 | Manning | 296/37.5 |
| 3,094,354 A | * | 6/1963 | Bernier | 297/112 |
| 5,685,470 A | * | 11/1997 | Moore | 224/567 |
| 6,015,071 A | | 1/2000 | Adomeit | |
| 6,079,773 A | * | 6/2000 | Hassan | 297/188.13 |
| 6,135,332 A | * | 10/2000 | Eleam | 224/275 |
| 6,139,096 A | | 10/2000 | Anderson | |
| 6,254,162 B1 | | 7/2001 | Faber | |
| 6,276,582 B1 | * | 8/2001 | Alexander | 224/275 |
| 6,279,798 B1 | * | 8/2001 | Partch et al. | 224/275 |
| 6,302,465 B1 | | 10/2001 | Faber | |
| 6,461,090 B1 | | 10/2002 | Faber | |
| 6,488,327 B1 | | 12/2002 | Pearse | |
| 6,742,837 B1 | * | 6/2004 | Alexander | 297/188.21 |
| 6,929,321 B1 | | 8/2005 | Shrock | |
| 2004/0134946 A1 | * | 7/2004 | Gammon | 224/275 |

* cited by examiner

*Primary Examiner*—Peter R. Brown

(57) ABSTRACT

A portable stowable cargo restraining enclosure assembly for limiting movement of cargo combined with and affixed to a seat cushion. The portable cargo restraining enclosure assembly includes a plurality of sidewalls which are pivoted and/or folded into a collapsed or stowed condition attached to the underside of a seat cushion. During use, the enclosure assembly is pivoted up into and the sidewalls deployed to cooperatively form a walled enclosure for restraint of cargo. The seat cushion is preferably wedge shaped so that when used as a seat cushion, it provides orthopedic advantages. When used as a cargo restraining device, the wedge shape of the cushion helps make the base of the cargo restraining device parallel to the ground plane.

3 Claims, 13 Drawing Sheets

PORTABLE CARGO STORAGE AND WALLED ENCLOSURE ASSEMBLY

TECHNICAL FIELD

The present invention relates, in general, to assemblies and methods for restraining cargo movement, and more particularly, relates to barrier, wall or partition assemblies which form enclosures incorporated into or with portable seat cushions and/or back support systems and to the methods by which such seat and or back support enclosure assemblies are mounted to transport vehicles.

BACKGROUND ART

Over 16.5 million motor vehicles are sold in the United States to consumers every year. Today's consumers generally regard the ability to transport cargo in vehicles of various descriptions as a highly desired feature. Said transported cargo may include, but is not limited to, a variety of items including fast food containers, groceries, flowers, potted plants, school books, children's toys, purses, wallets, stationary items, computers, electronic equipment.

Currently, transported cargo is most typically transported in an unrestrained fashion by placing items on the transport vehicle floor, on the seat, the transport vehicle floor and/or cargo bed. Said unrestrained transported cargo is subject to spilling, vehicle or cargo damage, and often causes driver distraction from safe driving activities as it may move during transport. In recent years vehicle manufacturers and others have developed a series of restraining devices that are a fixed non portable and permanent part of the transport vehicle such as restraining devices incorporated as part of a vehicle seat, disclosed in U.S. Pat. Nos. 6,139,096, 6,488,327 B1, and 6,929,321. Additionally, portable products that restrain cargo may be in the form of cargo boxes, as disclosed in U.S. Pat. No. 6,015,071 or part of transport vehicle cargo beds or floor mats as disclosed in U.S. Pat. Nos. 6,254,162, 6,302,465 and 6,461,090. Common problems encountered with current permanent methods of restraining cargo include both the cost of incorporating the inventions within the transport vehicle and the fact that when it is the time for the cargo to be removed from the vehicle, it must be placed in another type of restraining or carrying device to be transported to the cargo's final destination. Additionally, cargo restraining devices incorporated as part of cargo bed liners or floor mats are clearly not designed to carry the restrained transported cargo from the transport vehicle to the cargo's final destination. And none of the aforementioned inventions or known inventions in the field solves the problem of transported vehicle passenger comfort, providing additional seat and back support for therapeutic purposes. The multiple purposes of restraining cargo in a transport vehicle, providing for said cargo to be easily transported from the vehicle to the cargo's final destination, and providing a transported passenger with seat and back support for more comfortable and therapeutic transportation is no where found in the known art.

The same problem of attempting to restrain cargo can be also be seen in every day sporting activities such as the simple task of trying to carry purchased food items from a food stand to your bleacher seat. In this case the spectator must either hold on to the purchased items and hope they don't spill, or use food stand cardboard carriers which are flimsy and can cause further spilling.

Important to vehicle purchasers and any person who wishes to sit down, is personal comfort and proper physical body support. As a result, in addition to the standard vehicle seat already installed in a transport vehicle, consumers annually purchase millions of additional seat cushion pads and back support products which improve sitting comfort. At sporting events, tens of millions of sporting enthusiasts use seat cushions and/or back support systems to remain comfortable during the sporting events. Medical doctors and therapists often prescribe seat cushion and back support products in order to improve their patients' medical conditions which have led to seat cushion and/back support industry in excess of 1 billion dollars per year.

Accordingly, it is an object of the present invention to provide portable barrier, wall or partition assemblies which form enclosures incorporated into or with portable seat cushions and/or back support systems and to the methods by which such seat and or back support enclosure assemblies are easily used with transport vehicles, and/or seat cushion and/or more permanent back support structures. Further, it is an object of the present invention that it can be easily stowed in or as part of a portable seat cushion and/or back support system in a compact configuration and is easily deployed to form a walled enclosure restraining a wide variety of transported cargo.

It is a further object of the present invention to provide a portable stowable cargo restraining enclosure assembly which can be readily placed in a variety of environments including but not limited to transport vehicles, seating configurations, and sporting event bleacher seats.

Another object of the present invention is to integrate the portable stowable cargo restraining enclosure assembly which has fewer components, is easier to store and use, and provides a more secure restraint methodology than conventional cargo enclosures. Further the present invention is easy to carry by the user.

Still another object of the present invention is to provide a portable stowable cargo restraining enclosure assembly and method which will not impede cargo loading or unloading, is durable and is relatively inexpensive to construct.

An object of the present invention is to provide a portable stowable cargo restraining enclosure assembly and method incorporated into or with portable seat cushions and/or back support systems which improves the personal comfort and proper physical body support of the user in a wide variety of market applications.

Another object of the present invention is to provide, if needed, a method for attachment of the present invention to the vehicle seat assembly of a transport vehicle employing the same, and/or other non transport vehicle seat and/or cushion assemblies.

As used herein, the expression "transport vehicle" shall include motor vehicles, such as automobiles, buses, pickups, SUVs, vans, commercial trucks, watercraft, aircraft, trains, even golf carts, and equivalent motored vehicles used to transport cargo, as well as towed or un-powered cargo carriers, such as trailers and barges and equivalent un-powered vehicles used to transport cargo. "Bleachers" shall include any form of bench or seating assembly utilized as a seating device for sitting and viewing a variety of sports or other activities.

The portable cargo storage and restraining barrier walled enclosure assembly and method seat cushion and/or back support system and method of the present invention have other objects and features which will become apparent from, or are described in more detail in, the following description of the Best Mode of Carrying Out the Invention and the accompanying drawing.

DISCLOSURE OF THE INVENTION

The present invention provides a portable stowable cargo restraining enclosure assembly, a seat cushion and/or back support system and a method for its use. The portable stowable enclosure assembly most preferably is incorporated into or affixed to a seat cushion and/or back support structure. The enclosure includes a collapsible securement structure, and a cargo restraining enclosure assembly mounted thereto. Preferably, the enclosure assembly includes at least one, and most preferably a plurality, of sidewalls which are movable into and out of an enclosure assembly storage cavity in or attached to the seat cushion and or back support system. The sidewalls pivot up and out of the seat cushion or cushion base and or back support structure to form a storage cavity.

Further, an additional embodiment of the present invention is to provide a cargo restraining enclosure assembly and method for use in which at least one barrier device that includes a barrier restraining structure, such as a rotatable axle or spindle and barrier housing, in which a flexible barrier member is stored in a rolled up stowed condition, when not deployed, in a storage cavity in or as part of an incorporated and/or portable seat cushion and/or back support system. The barrier restraining structure may also be a flexible member. During use, the barrier housing is pulled to unroll a length thereof that may be used to wrap around or encircle a portion of a piece of cargo in the cargo space.

The method of the present invention comprises, briefly, the steps of locating or mounting the a portable stowable cargo restraining enclosure assembly seat cushion and/or back support system. The portable stowable enclosure assembly most preferably is incorporated into or affixed to a seat cushion and/or back support structure, seat cushion and/or back support system incorporating a enclosure assembly to the transport vehicle proximate cargo space, selectively moving the enclosure assembly between a stowed position and a deployed position, and securing the enclosure in the deployed position limiting movement of cargo. Most preferably, the mounting step is accomplished by locating the seat cushion and/or back support system incorporating an enclosure assembly within the transport vehicle, locations including but not limited to the passenger seat. The moving step is accomplished by pivoting a plurality of sidewalls up and out the storage cavity to a deployed position in which they cooperate and/or are coupled together to provide a walled enclosure in which cargo can be positioned.

BEST MODE OF CARRYING OUT THE INVENTION

The present invention portable stowable cargo restraining enclosure assembly, in a transport vehicle having such enclosure assembly, where said enclosure is incorporated into or affixed to a seat cushion and/or back support system is particularly well suited for applications where the invention is placed on or attached to the passenger seat next to the driver and/or placed on or attached to the rear vehicle passenger seats.

Figure 1:
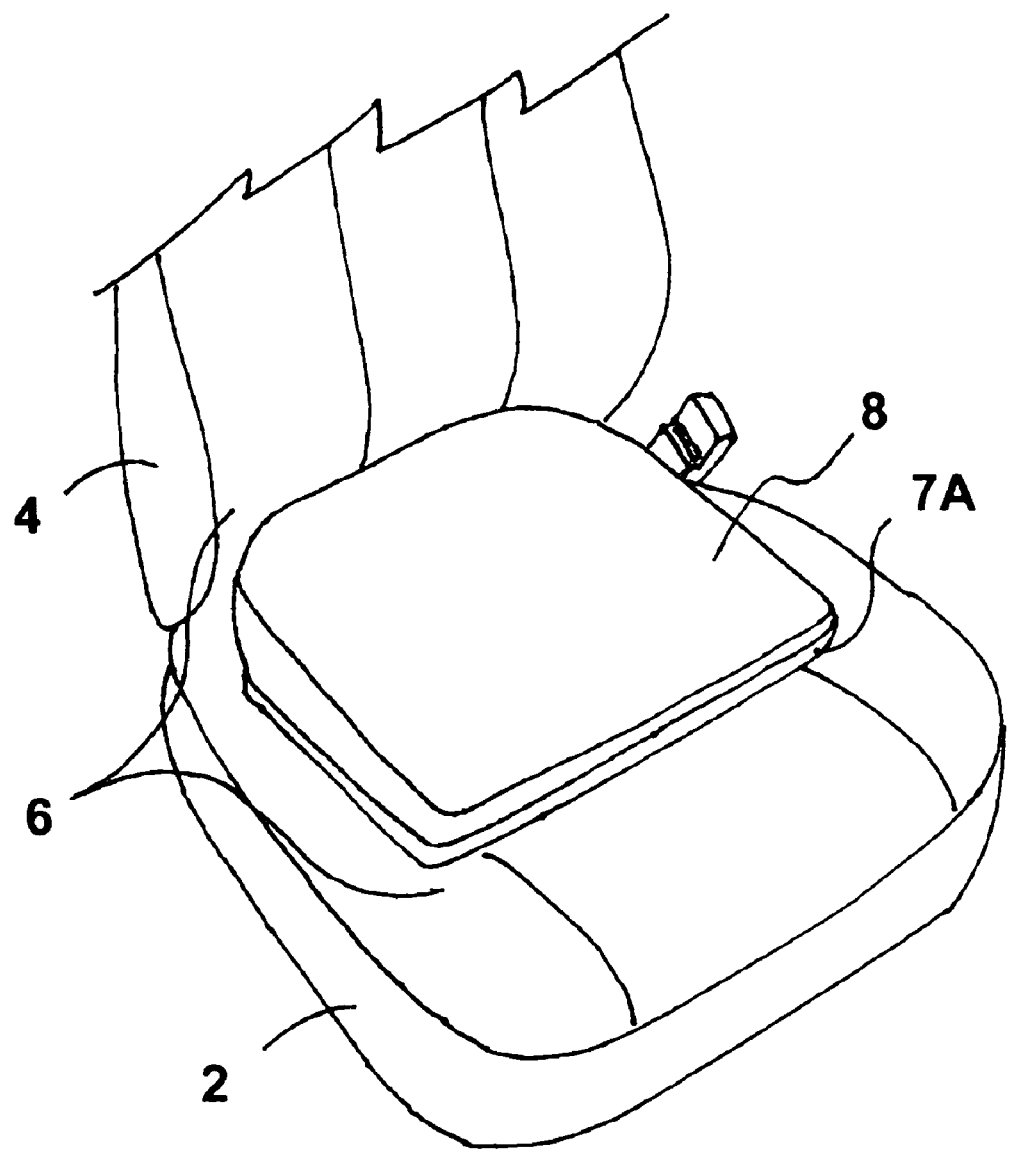
FIG. 1 is a top perspective view of a schematic representation of the portable stowable cargo restraining enclosure assembly, in a transport vehicle having such enclosure, where said enclosure is incorporated into or affixed to a seat cushion and/or back support system located on the seat of a cab of said transport vehicle, where perspective demonstrates the cushion side upright.
Figure 2:
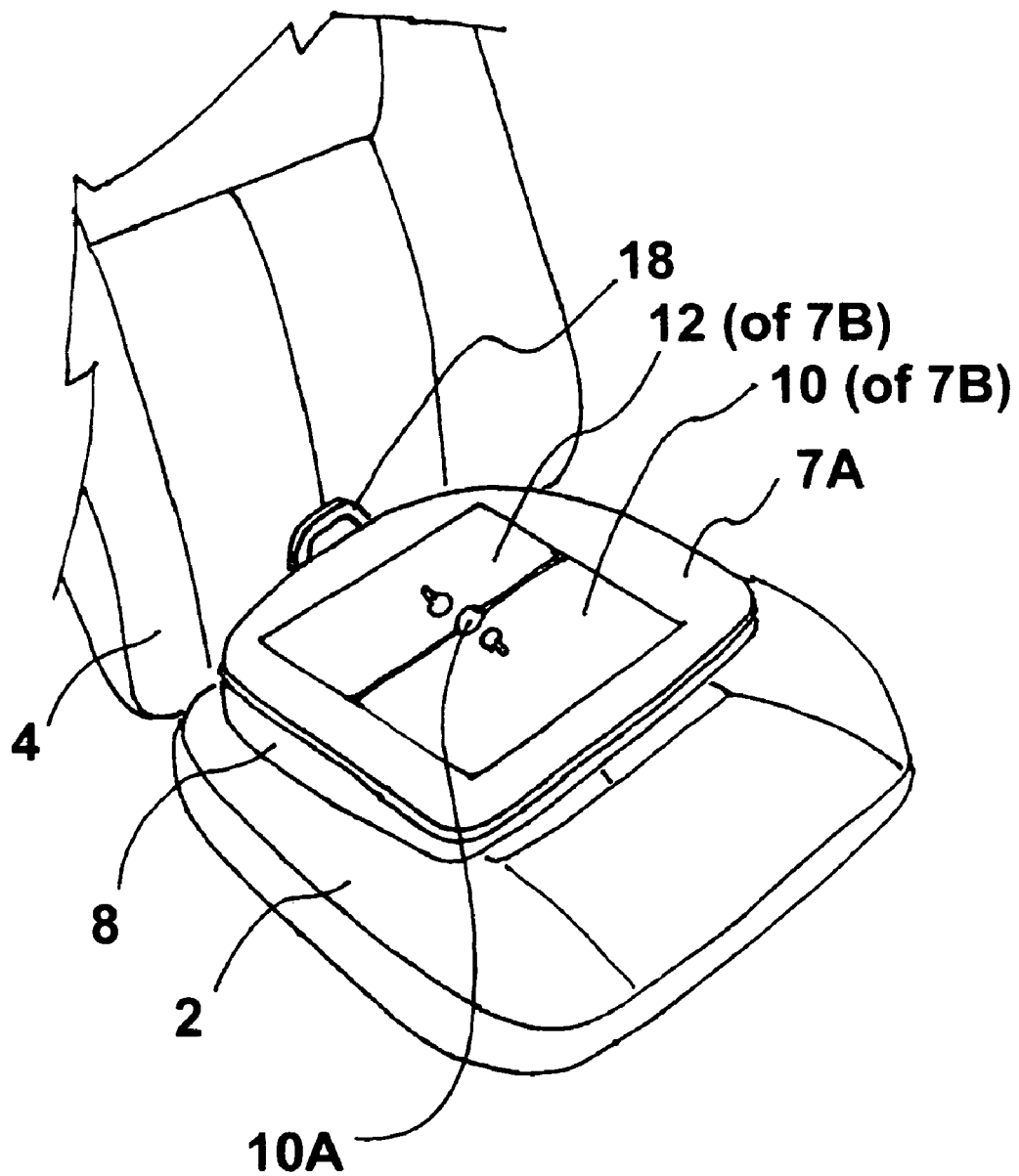
FIG. 2 is a top perspective view of the same portable cargo restraining enclosure assembly as in FIG. 1, showing the portable cargo restraining enclosure incorporated into or affixed to a seat cushion and/or back support system in a stowed but upright position.

FIG. 1 depicts a schematic representation of the present invention stowable cargo restraining enclosure seat pad assembly 6 incorporating the walled restraining enclosure 7B (not shown) and base plate 7A, located on a transport vehicle seat composed of the bottom seat section 2 and back support section 4 where said enclosure incorporated into or affixed to a seat cushion and/or back support system is not deployed and the seat cushion 8 portion is facing upright in order for the vehicle passenger to comfortably sit on the softer portion of the present invention. The seat pad assembly 6 may be wedge shaped from front to back to help a person's posture, relieving back stress and pain while sitting in the transport vehicle seat as a driver or passenger. When the user of the present invention wishes to utilize the stowable cargo restraining enclosure seat pad assembly portion 7B for restraining cargo, the present invention is flipped over exposing the restraining enclosure 7B which is incorporated in or affixed to seat cushion 8 of assembly 6, placing base plate 7A and enclosure 7B in the upright position as depicted in FIG. 2. If the wedge shaped design is chosen as design embodiment, assembly 6 may be placed with the thicker portion of assembly 6 placed on the rear portion of the seat 2 in order to better level and reduce forward movement of the cargo transported in the walled enclosure of the present invention 6.

Figure 3:
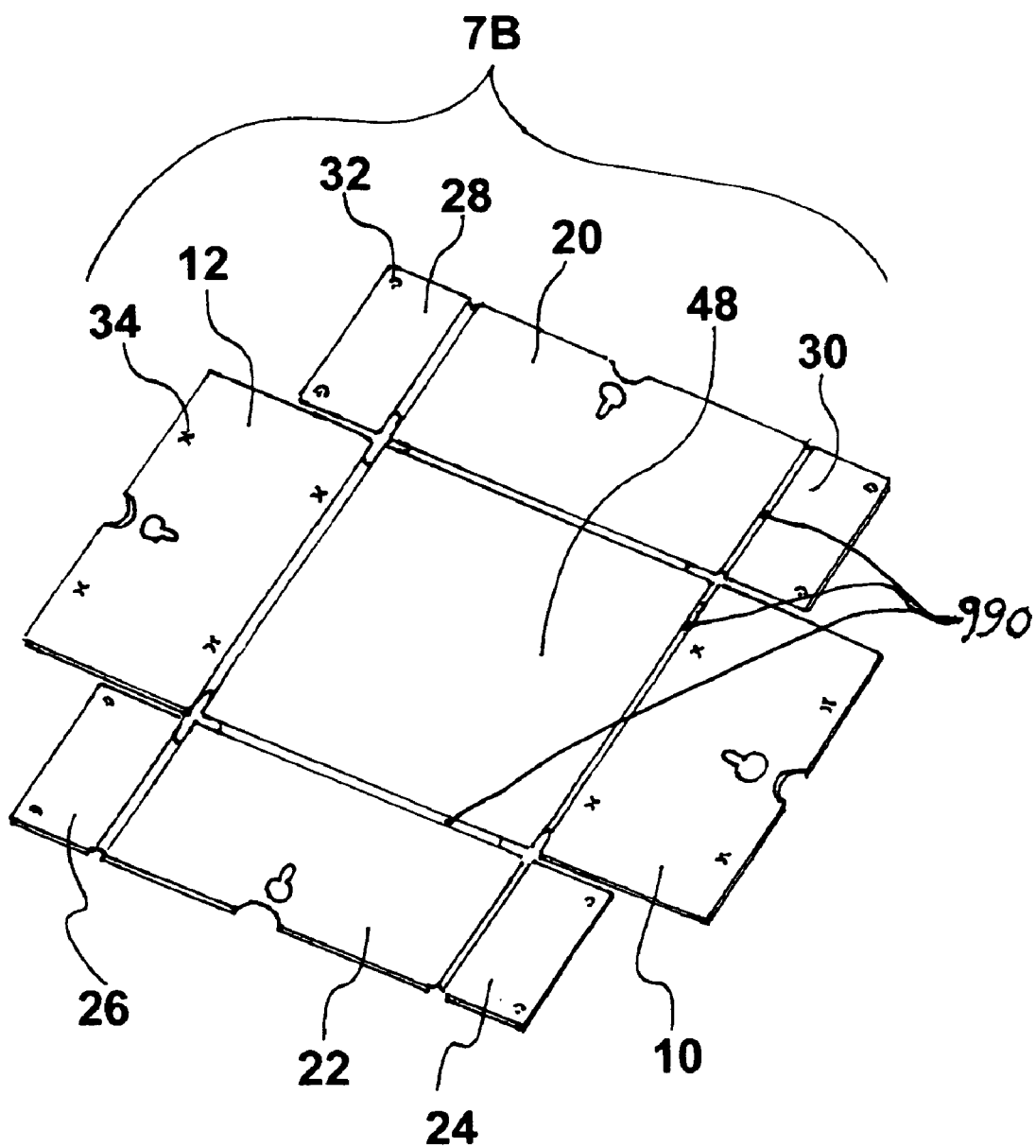
FIG. 3 is a fragmentary top perspective flat view of one embodiment of the portable cargo restraining enclosure assembly portion of the present invention incorporated into a seat cushion and/or back support structure removed from said cushion and/or back support system for purposes of demonstrating the Best Mode of Carrying Out the Invention.

In one potential manufacturing embodiment, the restraining enclosure assembly 7B may be manufactured using an injection molding type processes employing a single molded unit as depicted in FIG. 3 composed of restraining walled enclosure subassembly sections 10, 12, 20, 22, 24, 26, 28, 30 and 48 connected by injection molded living hinges. For purposes of this Best Mode of Carrying Out the Invention description however, various methods of subassembly walled enclosure subassembly connections may be utilized including but not restricted to the utilization of materials affixed to each wall, such as taping materials. Molding snapping mechanisms such as those depicted in FIG. 3 item 32, 34 may be utilized in order to maintain the restraining enclosure assembly in a continually deployed position.

Figure 4:
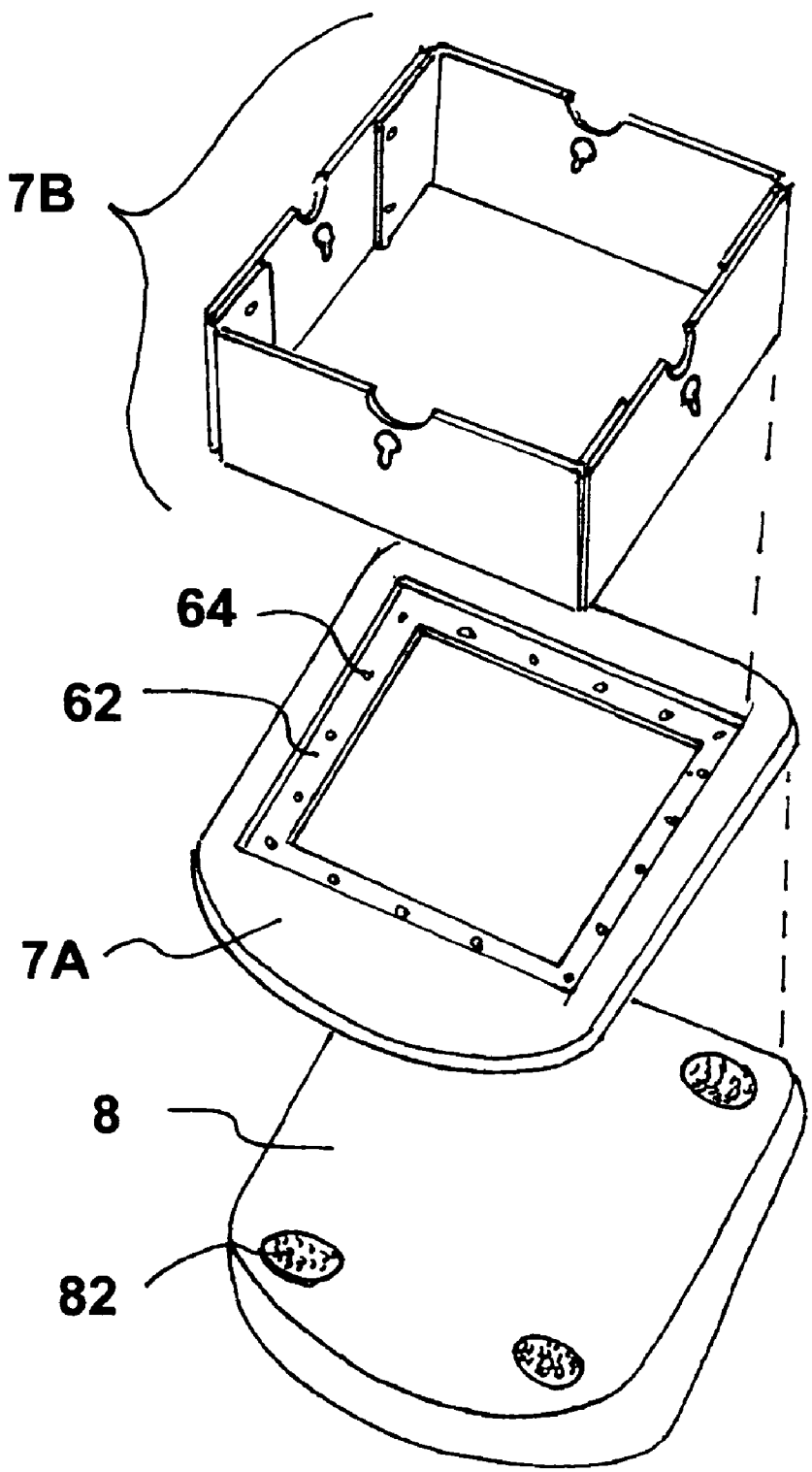
FIG. 4 is an exploded view of the Best Mode of Carrying Out the Invention shown in three parts; the top section showing the cargo restraining enclosure assembly in a fully deployed state, the middle section showing a base plate unit for attaching or affixing the top section cargo restraining enclosure assembly to a seat cushion and/or back support system, and the bottom section showing a seat cushion and/or back support system for attachment to the cargo restraining enclosure assembly and base plate.
Figure 5:
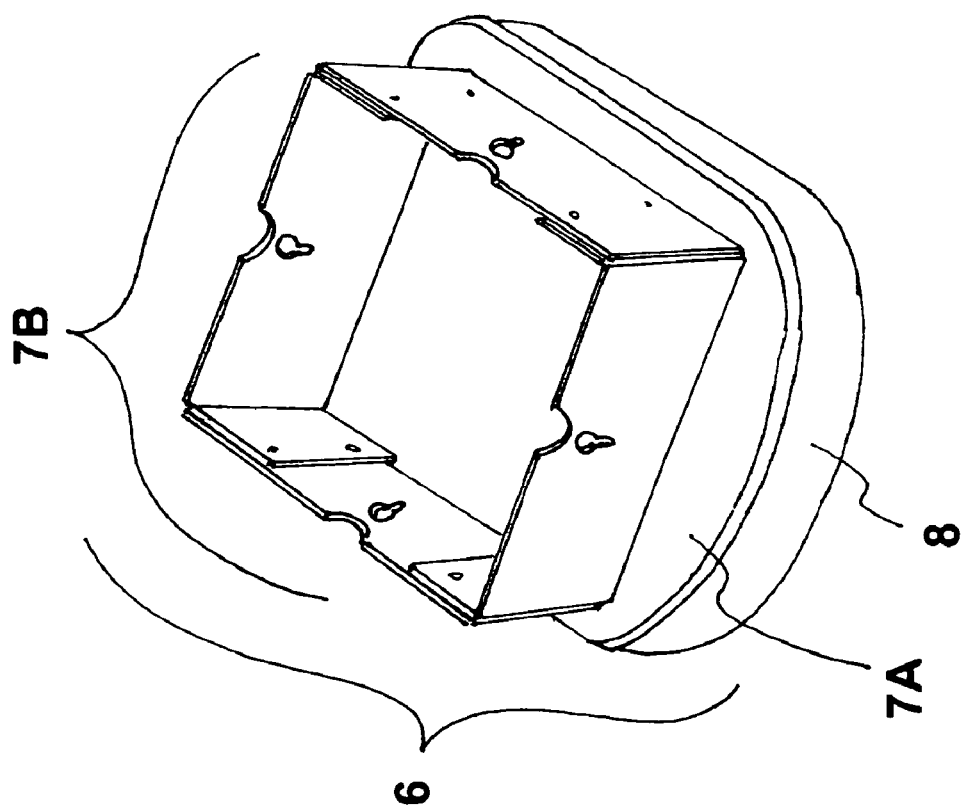
FIG. 5 is a top perspective view of an embodiment of the portable cargo restraining enclosure assembly incorporated into or affixed to a seat cushion and/or back support system with Best Mode of Carrying Out the Invention three parts assembled and with the enclosure assembly in a deployed position.

In one embodiment of Best Mode of Carrying Out the Invention as shown in FIG. 4 the walled enclosure assembly may be affixed to the seat cushion portion 8 of the seat cushion and/or back support system 6 through utilization of a base plate assembly unit 7A which may affix to seat cushion 8 through connecting devices 82, such as Velcro, and to walled enclosure assembly 7B by utilization of connectors 64 recessed in cavity 62, such as post or rivet connector systems. FIG. 5 displays the Best Mode of Carrying Out the Invention where the exploded view of the present invention 6 as shown in FIG. 4 is fully assembled, the cargo restraining enclosure assembly 7B in a fully deployed state, the middle section showing a base plate unit 7A for attaching the top section cargo restraining enclosure assembly to a seat cushion and/or back support system connecting 7B to 8, showing the present.

Figure 6:
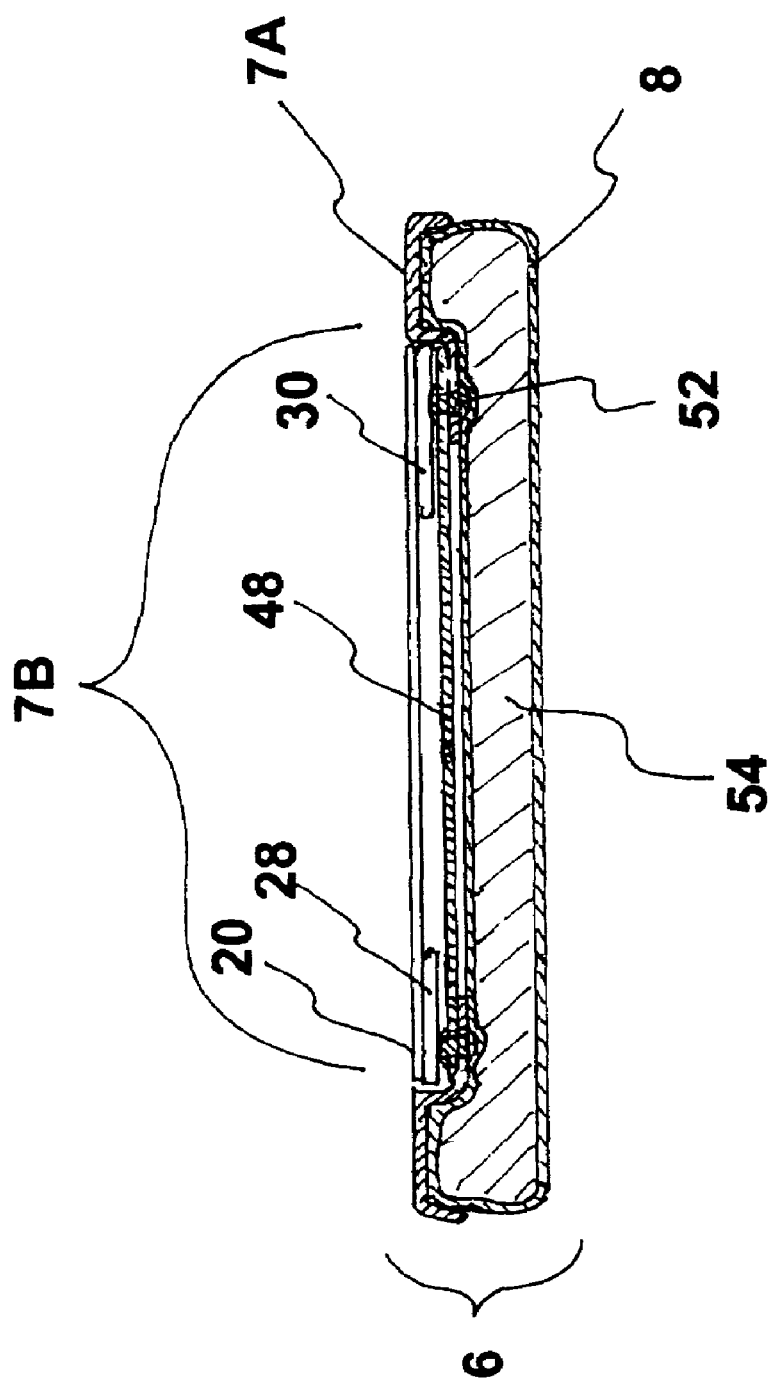
FIG. 6 is a cross section view of an embodiment of the portable cargo restraining enclosure assembly incorporated into or affixed to a seat cushion and/or back support system mounted on the seat of a cab of a transport vehicle showing Best Mode of Carrying Out the Invention three parts assembled and with the enclosure assembly in a stowed position.

FIG. 6 depicts a cross section view of an embodiment of the portable cargo restraining enclosure assembly incorporated into or affixed to a seat cushion and/or back support where Best Mode of Carrying Out the Invention 7A, 7B and 8 are assembled with the enclosure assembly 7B in a stowed position. 7B is contained within the recessed area of 7A, where bottom section 48 of 7B is affixed to 7A by connector 52. Walled enclosure subassemblies 20, 28 and 30 are called out in the representation for understanding the pictorial orientation of the drawing.

Figure 7:
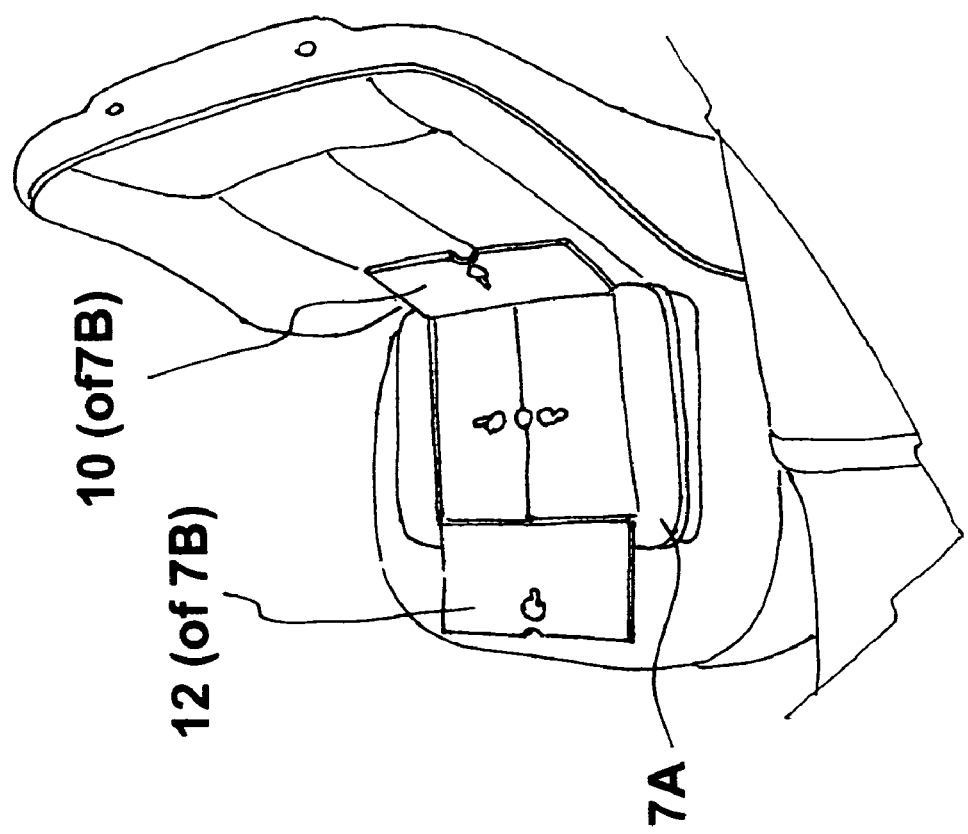
FIG. 7 is a top perspective view of an embodiment of the portable cargo restraining enclosure assembly incorporated into or affixed to a seat cushion and/or back support system located on the seat of a cab of a transport vehicle showing Best Mode of Carrying Out the Invention with two of the surrounding structures in the process of deployment.
Figure 8:
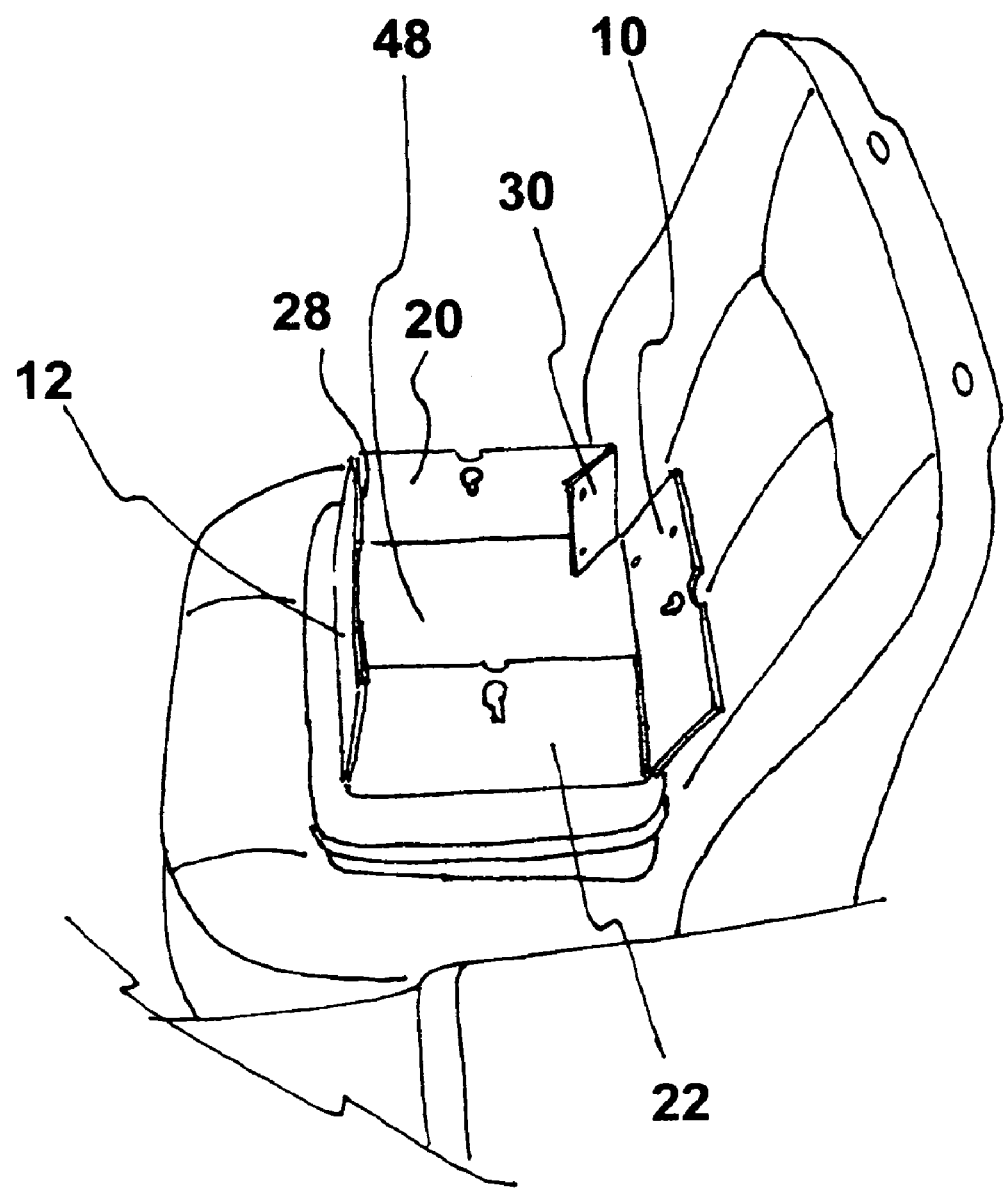
FIG. 8 is a top perspective view of an embodiment of the portable cargo restraining enclosure assembly incorporated into or affixed to a seat cushion and/or back support system located on the seat of a cab of a transport vehicle with Best Mode of Carrying Out the Invention in a partially deployed position showing surrounding wall movement prior to completion of full deployment.
Figure 9:
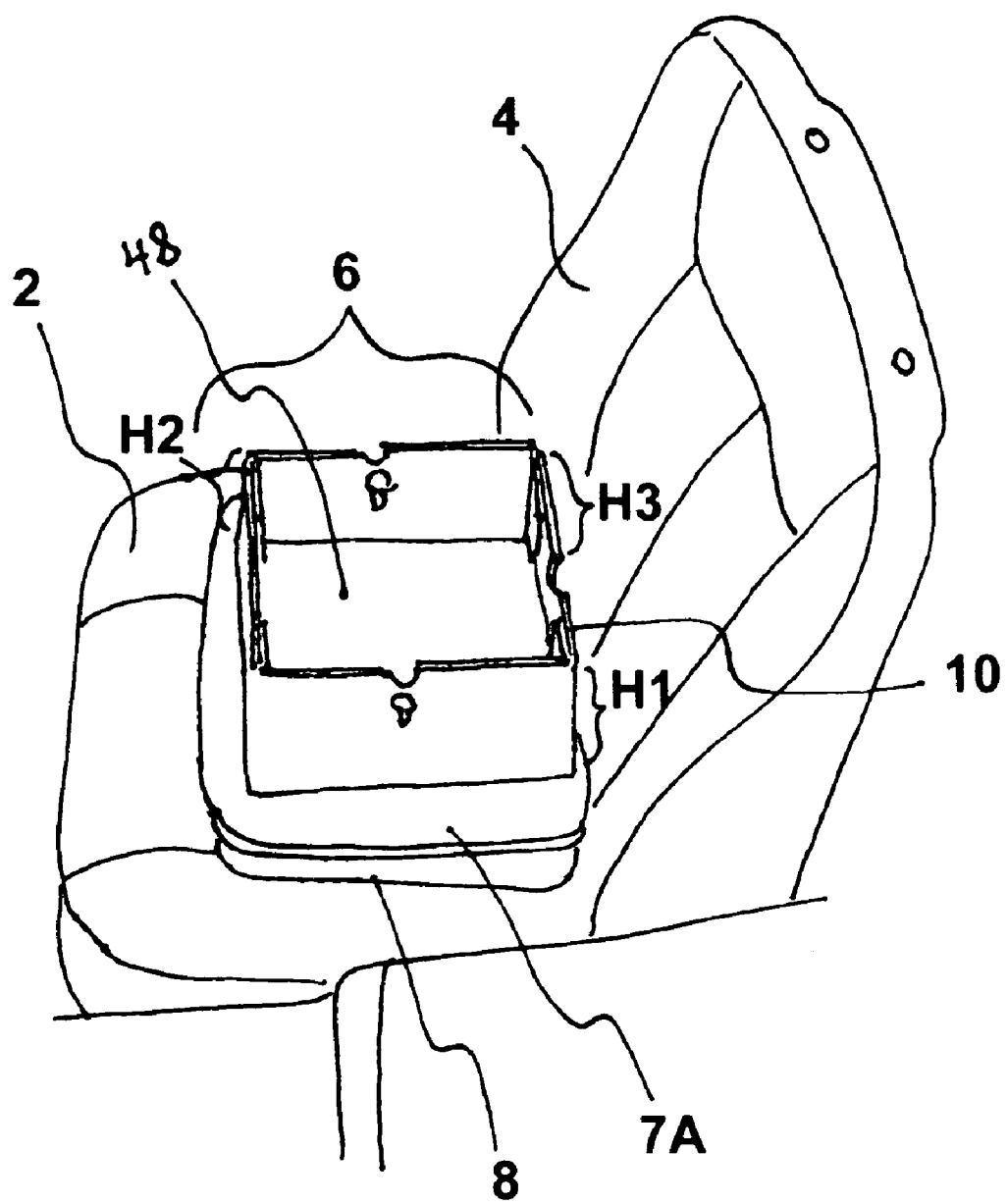
FIG. 9 is a top perspective view of an embodiment of the portable cargo restraining enclosure assembly incorporated into a seat cushion and/or back support system located on the seat of a cab of a transport vehicle showing Best Mode of Carrying Out the Invention in a fully deployed position.

In one embodiment of Best Mode of Carrying Out the Invention, the deployment process is shown in FIG. 7, through FIG. 9 where FIG. 7 shows walled enclosure subassembly units 12 and 10 first being deployed as part of 7B. In FIG. 8 as the walled enclosure sub assembly units 10 and 12 are deployed, units 24, 26, 28, 30 and subsequent walled units 20 and 22 are deployed. Fasteners 32 and 34 may be connected securing the walled enclosure assemblies and the completely deployed walled enclosure assembly as shown in FIG. 9 surrounds cargo.

The present invention portable stowable cargo restraining enclosure assembly 6, in a transport vehicle having such enclosure assembly, where said enclosure is incorporated into or affixed to a seat cushion and/or back support system need not be permanently installed within or on transport vehicle 40. In the embodiment shown stowable cargo restraining enclosure seat pad assembly 6 incorporating the walled restraining enclosure is sized and shaped to fit on the passenger seats of the vehicle cab, but other locations are possible.

In FIG. 8, it will be seen that the enclosure assembly preferably includes a plurality of sidewalls. Here, sidewalls 10, 12, 20, and 22 move from a near horizontal stowed position to an upright, substantially 90° orientation to the seat pad assembly 6. The sidewalls together define an open topped rectangular enclosure whose interior may be used to secure one or more pieces of cargo 20. While as illustrated sidewalls 10, 12, 20, 22 are abutting at their side edges, it will be understood that gaps between the sidewalls could also be present and the sidewalls would still combine to provide a walled enclosure capable of restraining cargo 20 against lateral motion. Encircling and containment of cargo piece 20 also could be accomplished if enclosure sidewalls 10, 12, 20, 22 were at an angle other than 90° to seat pad assembly 6.

Referring now to FIGS. 2, 8, and 9 opposing first and second spaced-apart sidewalls 10, 12 preferably have substantially equal heights H1, H2, and opposing third and fourth spaced-apart sidewalls 20, 22 have substantially equal heights H3. The various sidewalls 10, 12, 20, 22 preferably are hingedly attached at their base regions by recessed hinges to the seat pad assembly 6. Hinges for sidewalls 10, 12 are denoted generally as 110, while hinges for sidewalls 20, 22 are denoted generally as 120.

Without limitation, hinges 110 and/or 120 may join the sidewall members being hinged to seat cushion and/or back support assembly over the full length of the sidewall members, or over some fraction of the length. Hinge mechanisms are well understood in the relevant art and for that reasons no further detailed description will be given here.

Suffice to state, however, that the hinges permit the sidewall members to be moved between the stowed and deployed positions by pivoting up out of the seat cushion and/or back support system 6 and returned into a stowed position.

In order to insure the enclosure assembly does not fail to remain in a deployed position, several latch embodiments may be utilized including "Velcro" fastening materials, snaps affixed or integrated into 10, 12, 20, and 22.

Figure 10:
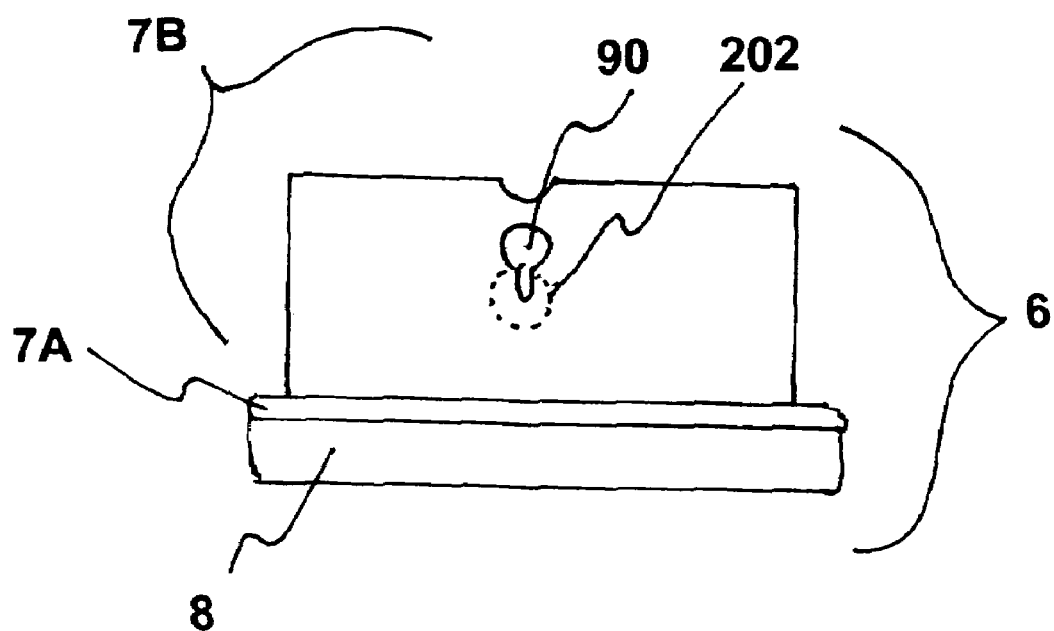
FIG. 10 is a side perspective view of an embodiment of the portable cargo restraining enclosure assembly incorporated into or affixed to a seat cushion and/or back support system located on the seat of a cab of a transport vehicle showing Best Mode of Carrying Out the Invention in a fully deployed position. Also shown is a hole in the walled enclosure assembly which allows for an embodiment which includes a securing device as shown in FIG. 11.
Figure 11:
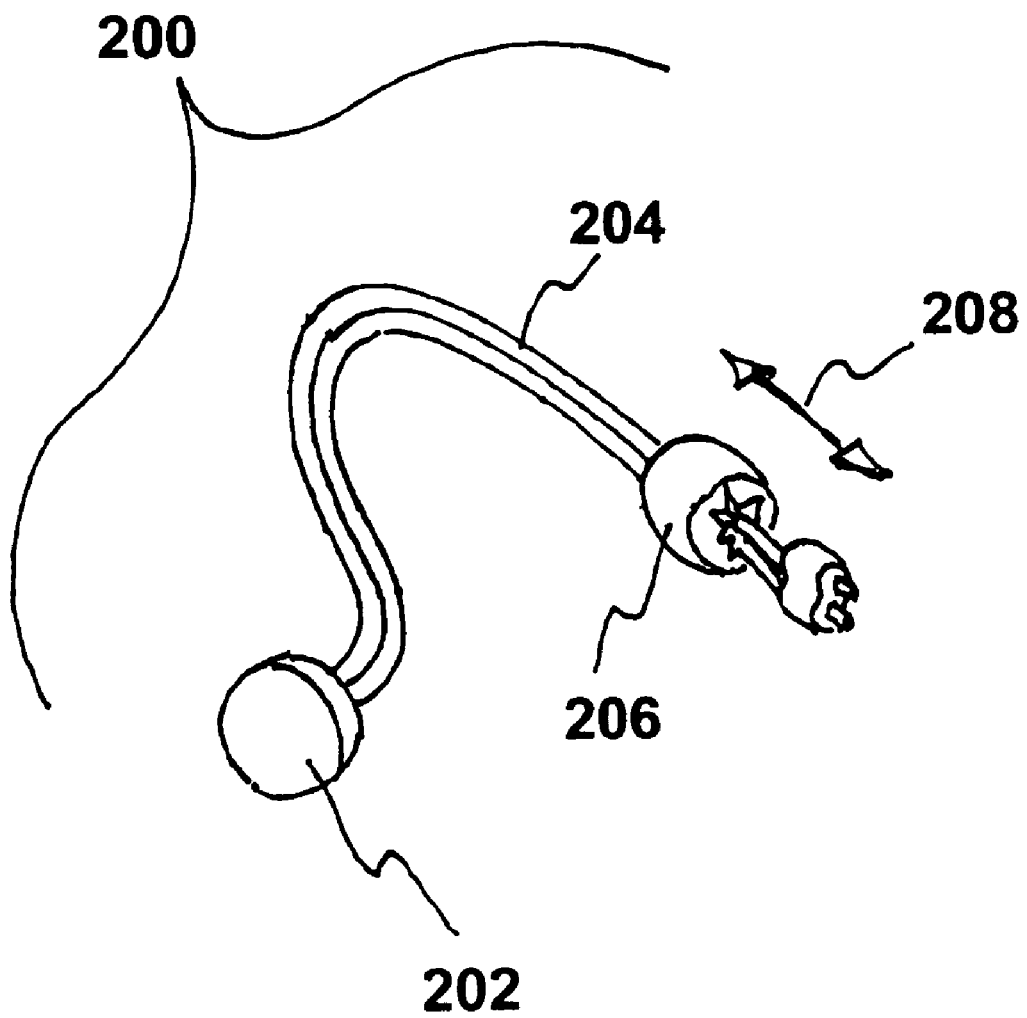
FIG. 11 is a perspective view of a cargo restraining cord unit, such as a "bungee cord," which is may be connected to the walls of the enclosure assembly used in further restricting cargo movement within the interior of the portable cargo restraining enclosure assembly incorporated into or affixed to a seat cushion and/or back support system.
Figure 12:
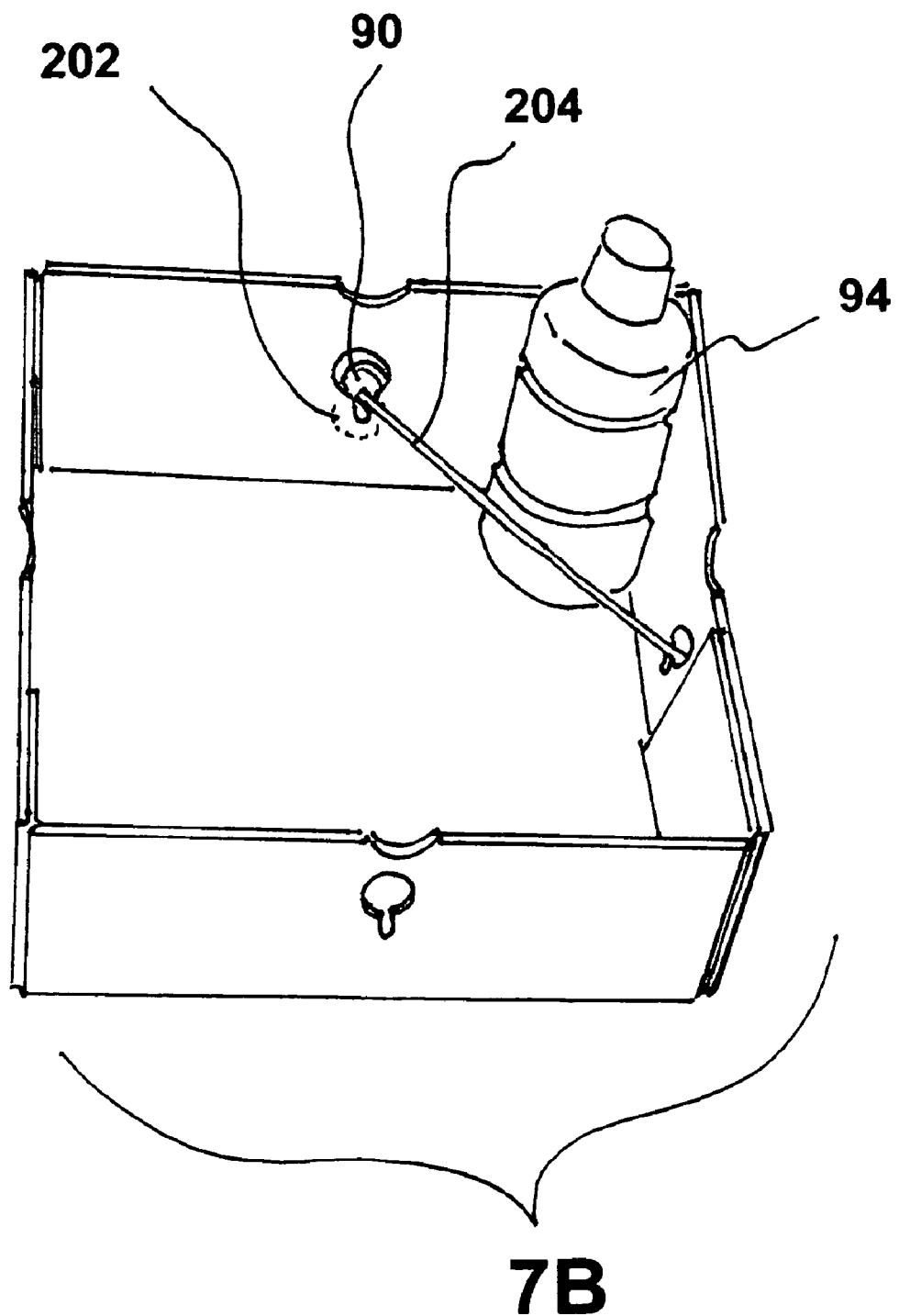
FIG. 12 is a top perspective view of an embodiment of the portable cargo restraining enclosure assembly incorporated into or affixed to a seat cushion and/or back support system mounted showing a Best Mode of Carrying Out the Invention in a fully deployed position where a cargo restraining cord is utilized to further restrict cargo movement within the interior of the cargo restraining enclosure assembly incorporated into a seat cushion.
Figure 13:
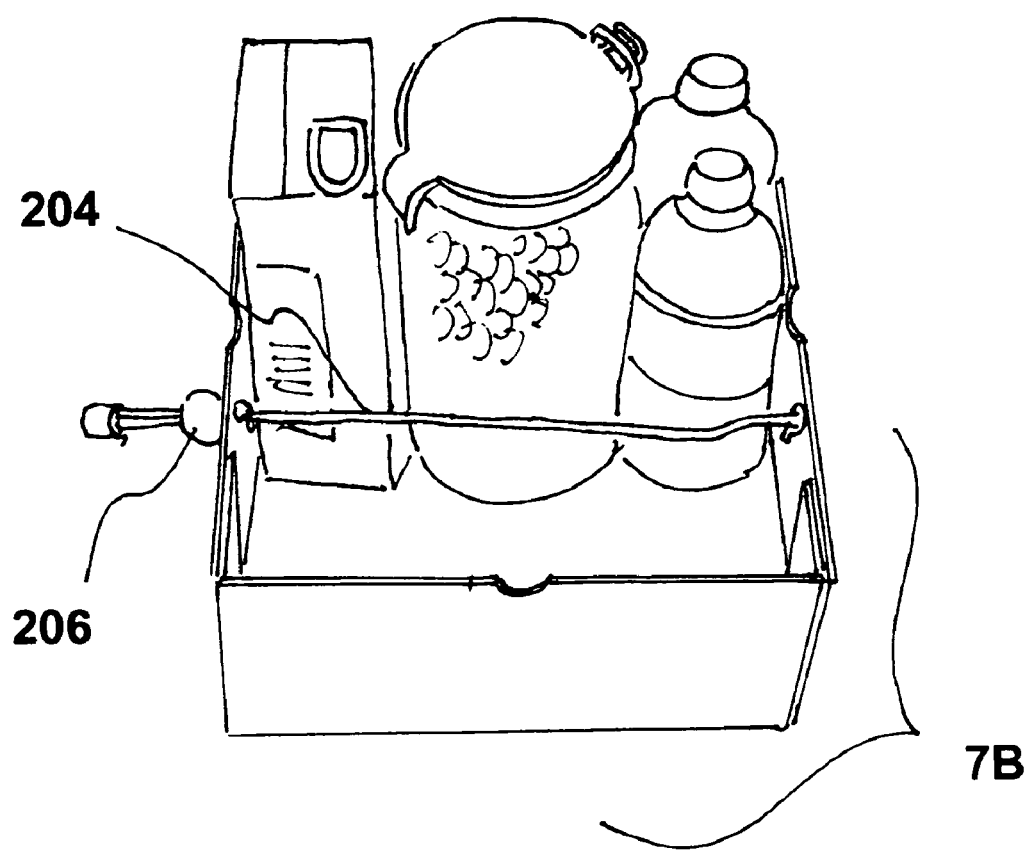
FIG. 13 is an additional top perspective view of an embodiment of the portable cargo restraining enclosure assembly incorporated into or affixed to a seat cushion and/or back support system showing Best Mode of Carrying Out the Invention in a fully deployed position where a cargo restraining cord is utilized in a different position than FIG. 12. to further restrict cargo movement within the interior of the cargo restraining enclosure assembly.

In one embodiment of Best Mode of Carrying Out the Invention a cord securing device 200 as shown in FIG. 11 with ball mounted end units 202 and 206, flexible cord 204 and potentially movable ball mounted end 206 sliding a distance 208 may be inserted as shown in FIG. 10 into walled enclosure subassemblies 10, 12, 20 and 22 thorough hole 90 where cord securing device 200 may be placed as shown in FIGS. 12 and 13 at 90% or 45% or other angles to the walled subassemblies 10, 12, 20, and 22 in order to further restrain cargo movement. As further shown in FIG. 13 the cord securing device 200 may be tightened by tensioning ball end 206 against restraining wall enclosure assemblies 10, 12, 20, and 22 moving ball end 206 along flexible cord 204.

What is claimed is:

1. A combination portable stowable cargo restraining enclosure assembly and seat cushion wherein said restraining enclosure is attached to the underside of said portable seat cushion;

Wherein said cargo enclosure includes a flat base portion and four hingeably attached sides;

Said sides capable of folding up via said hinge members to form said enclosure, or folding flat via said hinge members, for storage purposes;

Said sides removably retained to each other by standard attachment means when said sides are folded up in said enclosure position;

said flat base portion extending beyond said fold up sides and terminating in a low perimeter side wall that closely surrounds the perimeter of said cushion and;

wherein the said folded cargo restraining enclosure is very low profile when in the stored flat position so that the combined height of said seat cushion and said folded, stored enclosure is only slightly taller than the height of said seat cushion by itself.

2. A portable stowable cargo restraining enclosure assembly for limiting the movement of cargo as claimed in claim 1 wherein said cushion is wedge shaped for orthopedic advantage when used as a seat cushion and where said wedge shape provides a leveling effect for said base portion of said enclosure so that said base portion is on a horizontal ground plane when said enclosure and attached cushion is placed, cushion side down, on a standard angled vehicle seat.

3. A portable stowable cargo restraining enclosure assembly for limiting the movement of cargo as claimed in claim 1 wherein the retaining walls of said enclosure each include a centrally located keyhole shaped aperture that accepts a bungee cord restraining assembly that, when used to partition off portions of said enclosure, helps keep small items from moving within said enclosure.

* * * * *